United States Patent [19]
James

[11] 3,751,888
[45] Aug. 14, 1973

[54] MATERIALS HANDLING DEVICES

[76] Inventor: William Edward James, 24098 Country Squire Boulevard, Apt. 230, Mt. Clements, Mich.

[22] Filed: Dec. 18, 1970

[21] Appl. No.: 99,580

[52] U.S. Cl. ........................... 56/130, 56/2, 56/12.4, 56/226, 56/364, 56/366, 56/377
[51] Int. Cl. ............................................ A01d 45/22
[58] Field of Search .................... 56/2, 12.4, 14.4, 56/220, 226, 227, 364, 366, 377, 130, 400, 167

[56] References Cited
UNITED STATES PATENTS

| | | | |
|---|---|---|---|
| 470,061 | 1/1892 | Lindley | 56/226 |
| 1,047,147 | 12/1912 | Bamford | 56/366 |
| 1,195,172 | 8/1916 | Bamford | 56/366 |
| 2,506,980 | 5/1950 | Verger | 56/167 |
| 818,899 | 4/1906 | Martin | 56/377 |
| 3,151,435 | 10/1964 | Johnston | 56/377 |
| 2,991,613 | 7/1961 | Breed | 56/377 |
| 3,338,036 | 8/1967 | Hurlburt | 56/227 X |
| 3,472,008 | 10/1969 | Hurlburt | 56/226 |
| 1,707,878 | 4/1929 | Roosa | 56/364 UX |
| 3,282,408 | 11/1966 | Lohrentz | 56/227 X |
| 2,654,984 | 10/1953 | Fiess | 56/226 |

*Primary Examiner*—Russell R. Kinsey
*Assistant Examiner*—J. A. Oliff
*Attorney*—B. Franklin Griffin, F. Prince Butler et al.

[57] ABSTRACT

An "oblique reel" materials handling device wherein link bars or tine bars are carried between end members rotating on parallel offset axes and the tine bars orbit in oblique circular paths as in the parallel bar hay rake, but also rotate, each on its own axis, as in the cylindrical reel of the typical pickup of a hay baler, combining advantages of the parallel bar reel with the freedom of tine orientation control of the cylindrical reel in one device for use in a wide variety of harvesting machines and the like.

3 Claims, 19 Drawing Figures

Patented Aug. 14, 1973
3,751,888
5 Sheets-Sheet 1
INVENTOR
WILLIAM E. JAMES
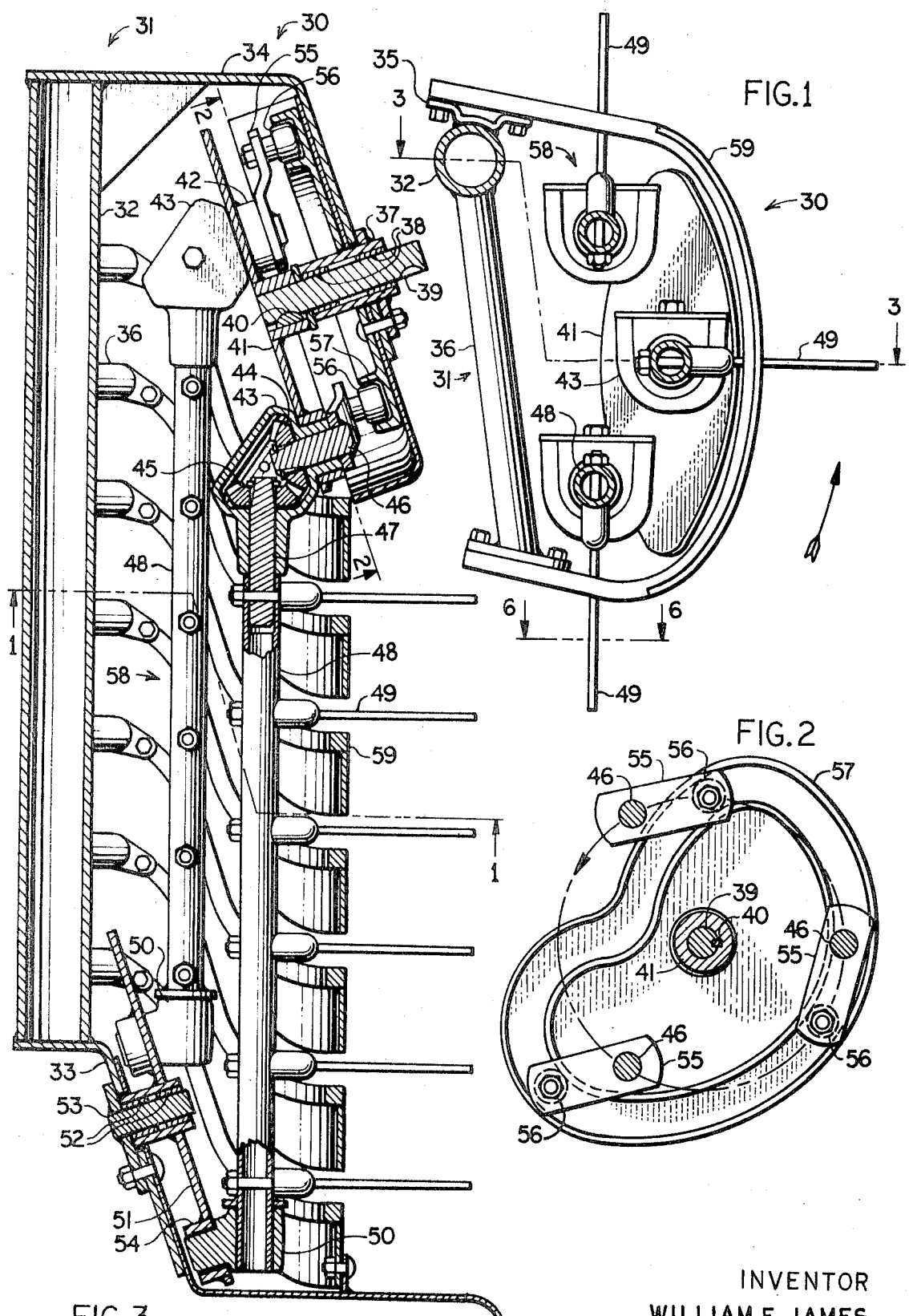

FIG. 4 FIG. 5 FIG. 6
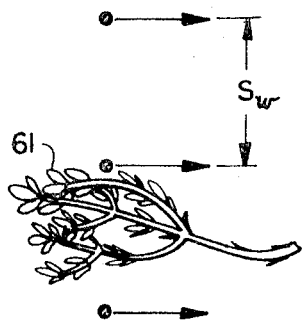
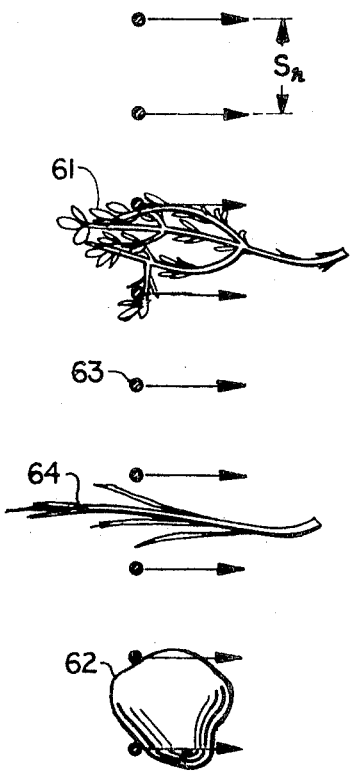
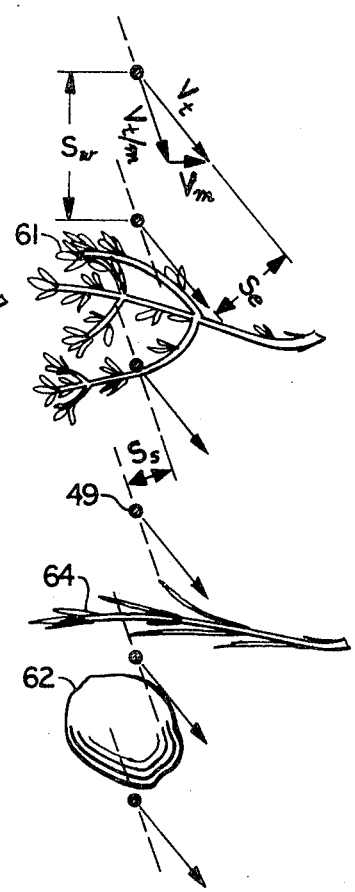
FIG. 7 FIG. 8
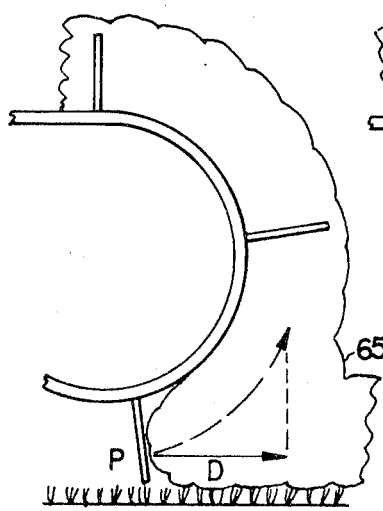
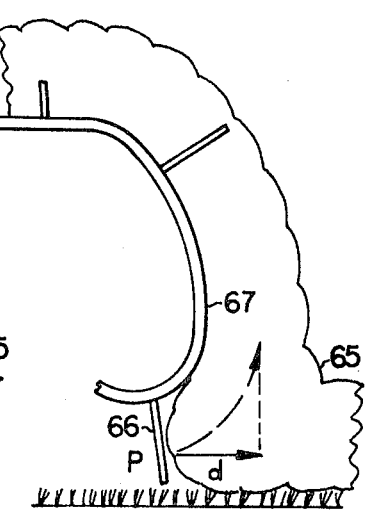
INVENTOR
WILLIAM E. JAMES

INVENTOR
WILLIAM E. JAMES

Patented Aug. 14, 1973
3,751,888
5 Sheets-Sheet 4
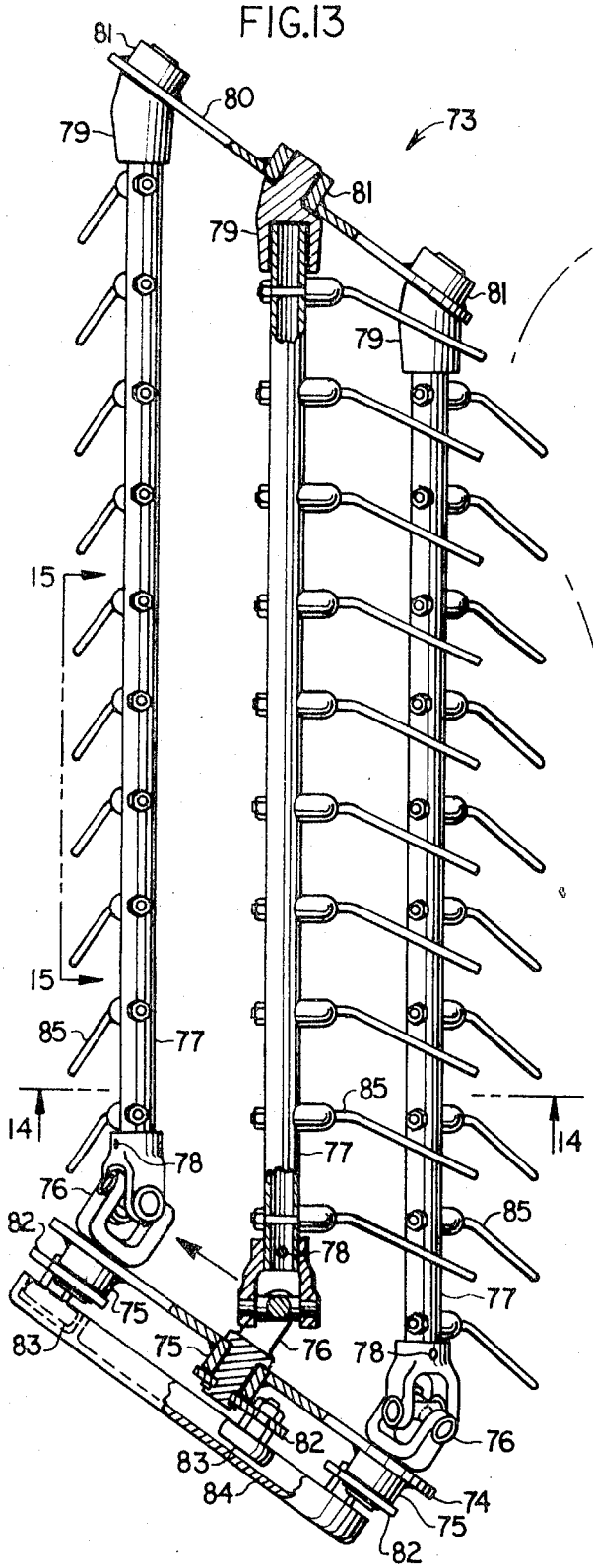
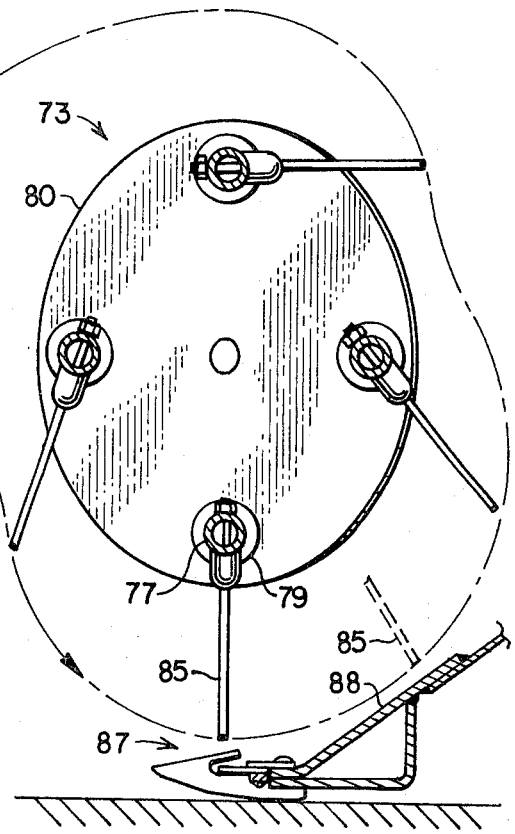
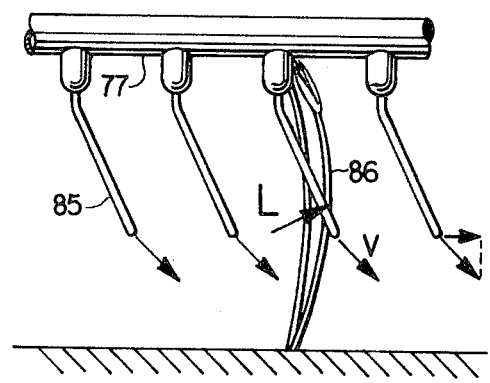
INVENTOR
WILLIAM E. JAMES

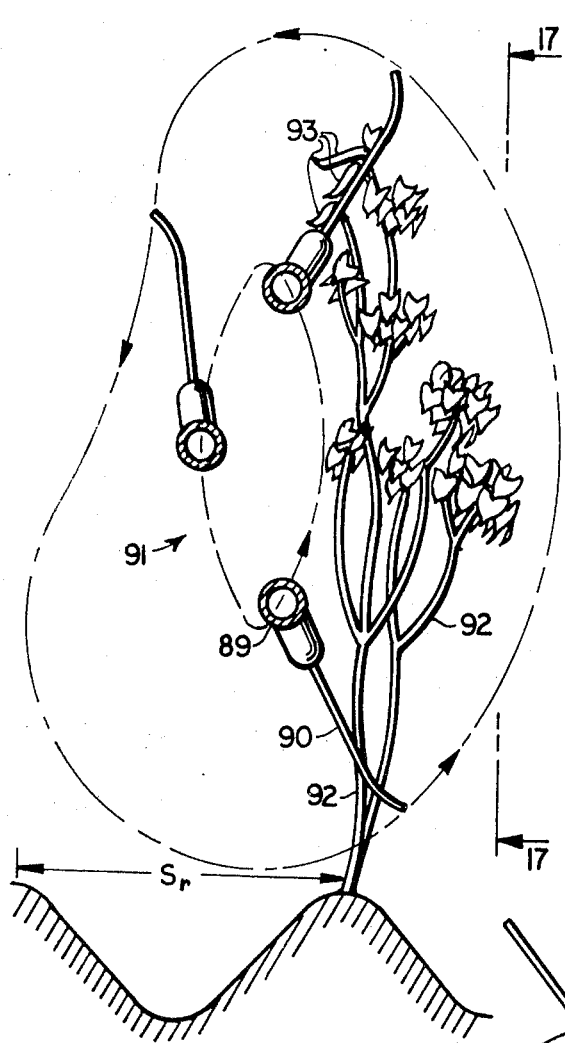
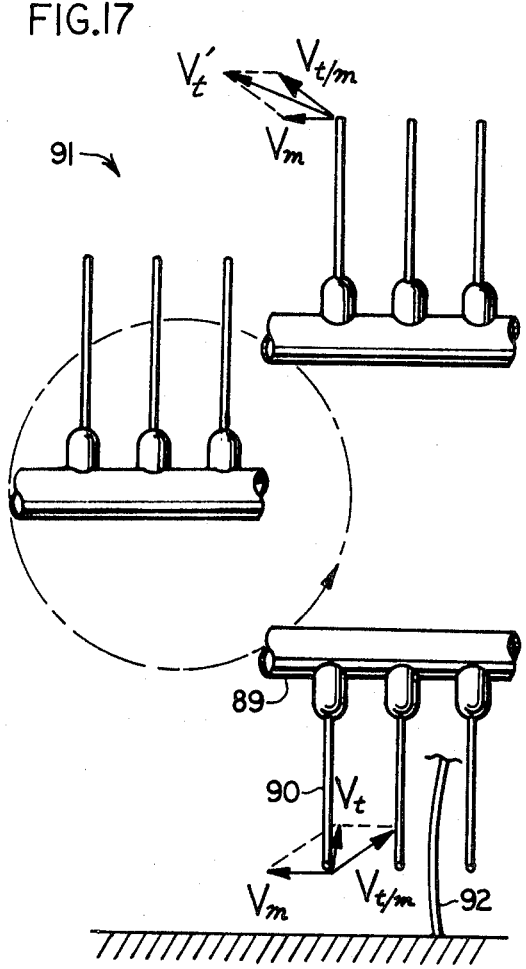
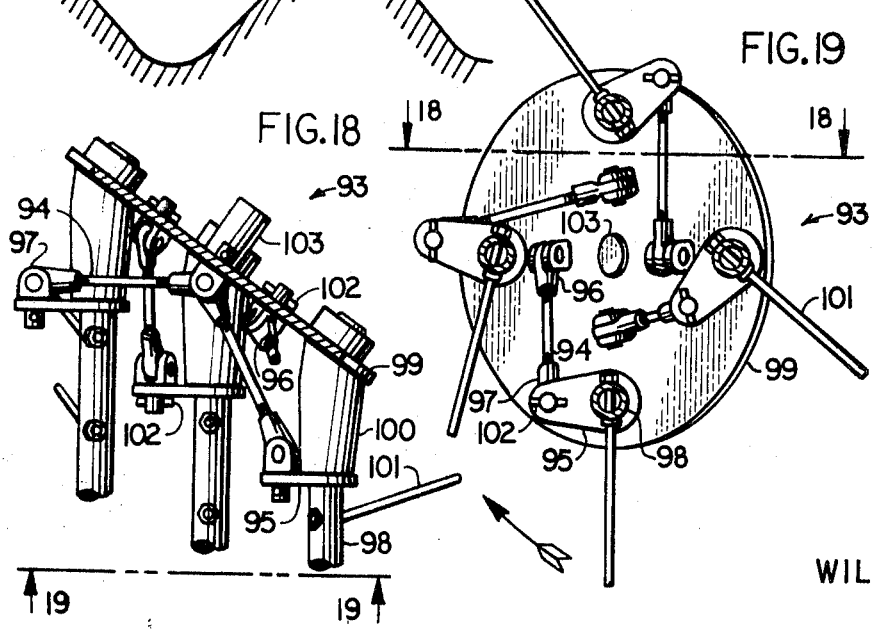
INVENTOR
WILLIAM E. JAMES

MATERIALS HANDLING DEVICES

A wide variety of harvesting machines employ a cylindrical reel type device in which tines are carried on parallel bars individually rotatable and controlled by cam and followers at one end of the reel. In a pickup on a hay baler, for example, the cam is shaped so that the tines project radially outward between guards around the bottom, front and top of the reel to intercept and lift material from the ground. Then, where material is transferred to other elements of the machine, each tine bar is rotated to give the tines an inclination such as to release the material and withdraw below the guards as they proceed around the back of the reel to return to the ground to intercept more material.

There are a number of limitations and difficult comprises inherent in this simple device, especially as herein described for the pickup application. It is commonly known that a relatively wide tine spacing (about 4 inches) causes significant losses of material in some conditions. Decreasing the spacing (to about 2½ inches) reduces losses, but the number of rocks and the like picked up often increases to the point that related problems such as knife breakage in the machine overshadow gains in harvested yield.

It has been recognized that a transverse motion of the tines can increase a pickup's efficiency of intercepting crop material on the ground (U.S. Pat. No. 2,829,485). Also, the commonly known "parallel bar" hay rake has demonstrated widely a simple and reliable device providing a transverse tine motion and attendant efficient interception of material (U.S. Pat. Nos. 800,662 and 818,899). This simple parallel bar reel, though opportune as a raking device, can not serve as a pickup since the tine bars do not rotate as they orbit around the reel, and the tines point always toward the ground, lifting out of the material on the ground and not picking it up.

Various means have been invented for pivoting the tine bars on their own axes in the parallel bar reel in its application as a rake to allow making fluffy, better aerated windrows or to provide more effective tedding (U.S. Pat. Nos. 1,047,147, 1,195,172, and 3,151,435). Still, in these variations the tines always point generally toward the ground and, during a full turn of the reel, each tine bar exhibits absolutely no cumulative rotation. That is, compared to a stationary reference, each row of tines, during each complete orbit around the reel, merely swings forward and backward or is only adjustable and doesn't pivot at all during operation of the reel.

It is a primary object of this invention, therefore, to provide a practical new reel type materials handling device, hereinafter referred to as the "oblique reel", wherein each tine bar is rotatable about its own axis and, during each complete revolution of the reel, exhibits cumulative rotation on said axis.

It is another object of this invention to provide an oblique reel device as described in the preceding object wherein tine bar rotation, and thus tine attitude, is controlled by cam and follower means to allow broad flexibility in employing this device in a wide variety of applications.

It is another object of this invention to provide a practical new oblique reel pickup device.

It is another object of this invention to provide a practical new oblique reel raking device.

It is another object of this invention to provide a practical new oblique reel device easily convertible from pickup action to raking action and vice versa.

It is another object of this invention to provide a practical new oblique reel header reel for combines and the like.

It is another object of this invention to provide a practical new oblique reel crop picking device.

It is another object of this invention to provide an oblique reel device as described wherein tine bar rotation, and thus tine attitude, is controlled by means other than cam and follower means.

These and other objects and advantages of this invention will become apparent in the following specification and drawings wherein:

FIGS. 1 – 3 depict a pickup based on the oblique reel, FIG. 1 being a side elevation section (line 1 — 1 in FIG. 3), FIG. 2 showing the cam and followers as viewed from section line 2 — 2 in FIG. 3, and FIG. 3 being a sectional plan view taken along line 3 — 3 in FIG. 1.

FIGS. 4 – 6 are sectional plan views of the tines of a representative conventional pickup with wide spaced tines, a conventional pickup with narrow spaced tines, and the oblique reel pickup of FIGS. 1 – 3 (line 6 — 6 in FIG. 3) respectively demonstrating comparative tine action.

FIGS. 7 and 8 are diagrammatic side elevation views of a conventional pickup and an oblique reel pickup respectively showing relative action upon material as it is intercepted and picked up.

FIGS. 13 – 15 show a header reel based on the oblique reel, FIG. 13 being a plan view (with partial sectioning), FIG. 14 being a sectional side elevation view (line 14 — 14 in FIG. 13), and FIG. 15 being a partial front elevation view (line 15 — 15 in FIG. 13) of a tine bar showing tine shape and action.

FIGS. 16 and 17 show partially a bean snapper reel based on the oblique reel, FIG. 16 being a front elevation view and FIG. 17 being a side elevation view (line 17 — 17 in FIG. 16).

FIGS. 18 and 19 are a partial sectional plan view and a sectional elevation view (line 19 — 19 in FIG. 18) respectively of a header reel similar to that of FIGS. 13 – 15, but with the tine bars rotated by link and lever means.

Figure 9:
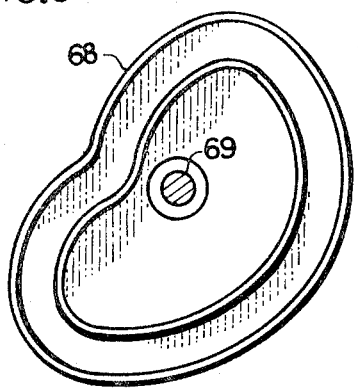
FIGS. 9 – 12 depict a convertible device based on the oblique reel and constructed similar to the pickup of FIGS. 1 – 3 except that the cam is rotatable about a central axis and, with the cam positioned as in FIG. 9, the tines describe a pickup action as in FIG. 10, while after the cam is rotated to the position of FIG. 11, the tines describe a raking action as in FIG. 12.
Figure 10:
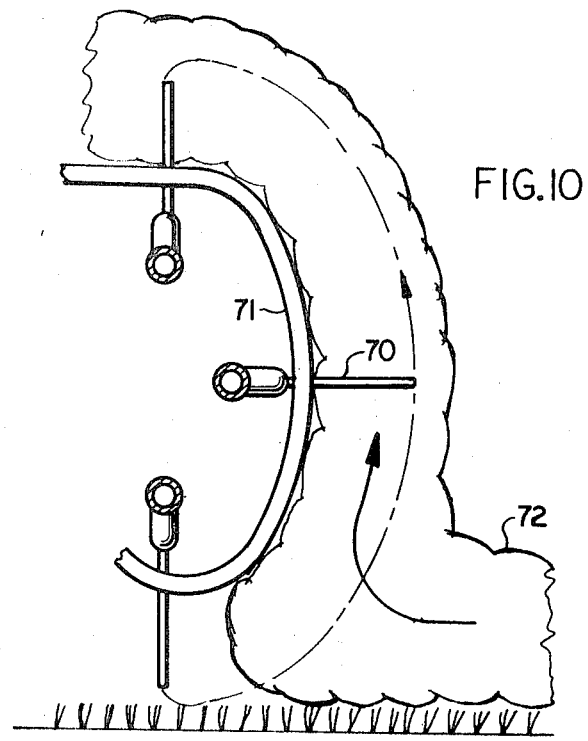
Figure 11:
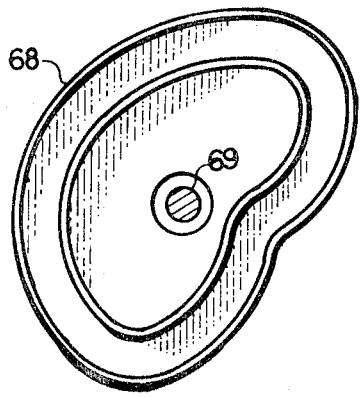

In detailed reference to the drawings, in FIGS. 1 – 3 a pickup generally indicated by numeral 30, illustrating one particular embodiment of the present invention, is shown in such configuration as to readily replace a conventional pickup on a typical harvesting machine such as a hay baler, for example. The frame, generally indicated by numeral 31, like that of a typical conventional pickup, is a weld assembly consisting of a tubular cross member 32, a right arm 33 (bottom of FIG. 3), a left arm 34, seven upper guard supports 35 (FIG. 1), and seven lower guard supports 36. A left bearing hub 37 with bushings 38 is affixed to left arm 34, rotationally supporting drive shaft 39 which can be driven at its free projecting end in any conventional manner. On the inside of left arm 34 (below it in FIG. 3), drive shaft 39 is keyed to, at its right end, with key 40, and supports for rotation therewith, left spider 41 having three bearings 42 spaced equidistantly around its periphery having axes parallel to drive shaft 39. Each bearing 42 has journaled in it a hub portion of a gearbox 43 containing bevel gears 44 and 45 splined respectively to an input shaft 46 and an output shaft 47. Each input shaft 46 projects from its gearbox 43 through the hub portion of gearbox journaled in bearing 42 so that its projecting end extends beyond the left side (upper right in FIG. 3) of left spider 41, while each gearbox 43 is supported for rotation on the opposite side. Each output shaft 47 exits its gearbox 43 at an angle (70° supplementary angle shown) to its corresponding input shaft 46 and is telescoped at its projecting end into one end of a tubular tine bar 48 aligned therewith. Three such tine bars 48 extend parallel to each other, one from each gearbox 43, toward right arm 33, each pinned to its corresponding output shaft 47 for rotation therewith by mounting one of six tines 49 affixed evenly spaced along each tine bar 48 so that its mounting bolt extension passes through both output shaft 47 and tine bar 48. At their opposite ends, at the right side of the pickup 30 (bottom of FIG. 3), each tine bar 48 is journaled in an end support 50, each end support 50 having a stub shaft portion extending toward right arm 33 at an angle (70°) from its corresponding tine bar 48 and parallel to corresponding input shaft 46 and bearing 42 at the left side (top of FIG. 3). A right spider 51 is supported for rotation about an axis parallel to the stub shaft portions of end supports 50 on bushings 52 contained therein and piloted on shaft and support plate 53 affixed to right arm 33 for this purpose. Right spider 51, like left spider 41, has three bearings 54 spaced equidistantly around its periphery having axes parallel to the axis of rotation of right spider 51 and to the axes of the stub shaft portions of end supports 50 which are journaled therein. As left spider 41 is rotated by shaft 39, then, right spider 51 is caused to rotate in timed relation with it, the tine bars 48 linking them, and orbiting bodily therewith in generally the same way as in the parallel bar rake.

But, here the mechanism and resulting tine action of the oblique reel of this invention departs significantly from the parallel bar reel. It is evident in FIG. 3 that the tine bars 48 are rotatable, each on its own axis as already described. In each gearbox 43, bevel gears 44 and 45, having a one-to-one ratio, cause output shaft 47 and tine bar 48 to rotate in unison with input shaft 46. At its projecting end on the left side of left spider 41, each input shaft 46 has affixed (shown welded) to it a follower lever 55, to the other end of which a follower roller 56 is affixed, its axis parallel to input shaft 46. Affixed to left arm 34 a face type cam 57 is situated parallel to left spider 41, its groove encircling drive shaft 39 and restricting movement of follower rollers 56 between the two flanges forming the groove therein. Thus, as the reel, generally indicated by numeral 58, revolves, follower levers 55 are caused to rotate, and through means of input shafts 46, bevel gears 44 and 45, and output shafts 47, the tine bars 48 with affixed tines 49 rotate, each in unison with its corresponding follower lever 55 and follower roller 56, the tine bars 48 and tines 49 completing one revolution for each full turn of the reel 58. The cam 57 is shaped substantially as in a conventional pickup as shown in FIG. 2 so that the tines 49 project generally radially outward at the bottom and front and top of the pickup (FIG. 1) through spaces between guards 59 partly surrounding the reel 58 and affixed to guard supports 35 and 36. An inward curve of the groove in cam 57 at its upper rear quadrant (upper left in FIG. 2) causes the tines 49 to maintain a generally vertical attitude while withdrawing through the guards at the top in FIG. 1, while an outward convolution in the cam 57 in its lower rear quadrant rapidly rotates the tines 49 faster than the reel 58 so that they again point generally downward when they reach the bottom of the reel 58 as in a conventional cylindrical pickup.

Thus, the oblique reel of this invention combines the transverse tine motion of the parallel bar reel with the controlled tine bar rotation of the cylindrical reel, the tines 49 sweeping obliquely to one side near the ground in this pickup application to intercept material, projecting radially outward to lift material at the front, then moving obliquely toward the opposite side at the top of the reel 58 to deliver the material into the harvesting machine. The guards 59 are more complex in shape than those of a conventional pickup as seen in FIG. 3, the top halves (not shown in FIG. 3) having generally the same form as the bottom portions shown.

In FIGS. 4 - 6 the tine action of the oblique reel pickup is compared with that of conventional pickups as the tines sweep along the ground to intercept material. FIG. 4 is a sectional plan view of the tines 60 of a cylindrical pickup having a wide tine spacing $S_w$, the arrows indicating the tines' paths as they travel over the ground. A representative stem of hay 61 is shown aligned generally parallel to these paths of travel, the orientation in which stems are most likely to be missed by the tines 60. A representative rock 62 is shown passing between the tines 60 also, an advantage of course, and the main reason, after cost, that most pickups have a relatively wide tine spacing. FIG. 5 is a sectional plan view of the tines 63 of a cylindrical pickup having a narrow tine spacing $S_n$. The same stem of hay 61 in this case is intercepted as shown, but the rock 62 is also caught and is much more likely to be picked up and fed into the machine. Still, a more slender stem 64 goes between the tines 63 when aligned parallel to tine travel as shown, and it is common to find most of the stems of hay lying generally parallel to tine travel of the conventional pickup. FIG. 6 is a sectional plan view of the tines 49 of the pickup of FIGS. 1 - 3 (line 6 — 6 in FIG. 1) having the same wide tine spacing $S_w$ as the cylindrical pickup of FIG. 4. Arrow $V_{tm}$ indicates the tine velocity relative to the machine, that is, the tine path with the machine stationary. The machine's forward velocity $V_m$ adds vectorially to the oblique tine velocity $V_{tm}$ as shown, resulting in the actual tine velocity over the ground $V_t$. Thus, the effective spacing of the tines 49 is $S_e$, much narrower than the actual spacing $S_w$. As shown, stem 61 is intercepted by the tines 49 sweeping transversely to it. Even the slender stem 64 is more likely to be intercepted, and, even if it were lying parallel to the oblique tine motion indicated by the arrows extending downward to the right in FIG. 6, it still would be as likely to be picked up as with the cylindrical pickup with narrow spaced tines 63 of FIG. 5. To even further increase the oblique reel pickup's interception efficiency the forward velocity of the machine $V_m$ can be reduced to give a more oblique resultant tine motion, further narrowing effective tine spacing $S_e$, effective tine spacing approaching a minimum value $S_t$, the effective spacing with the machine stationary. The oblique broken lines in FIG. 6 represent the tine paths with the machine stationary. The wide actual spacing $S_w$ of the tines 49, however, allows the rock 62 to pass between them as easily as between the equally wide spaced tines 60 of the cylindrical pickup of FIG. 4. Also, while the tines of a cylindrical pickup will roll a large stone or the like forward, the tines striking it several times, finally to pick it up, the oblique reel pickup will tend to roll such foreign objects to the side, reducing the chances of picking them up even if such objects will not pass between the tines.

FIGS. 7 and 8 are diagrammatic side elevation views of a cylindrical pickup and an oblique reel pickup respectively. The smaller forward displacement $d$ of the material 65 from the point of interception P by the tines 66 of the oblique reel pickup of FIG. 8 as they lift material 65 compared to the much larger displacement D of the conventional pickup of FIG. 7 is another advantage. Inclining the oblique reel pickup about a generally transverse axis as shown further augments this advantage, reducing the projection of the guards 67 ahead of the interception point P. Longitudinally compressing intertwined stems of material such as hay in a windrow has been shown to cause the stems to be much more easily detached from the mass, as fibers from a rope, contributing to loss of material. Also, longitudinal movement between stems within the windrow can cause branches and leaves to be broken from the stems, a major source of loss in legume crops where the leaves contain a high percentage of the total nutrient value. The tines of the oblique reel pickup as in FIG. 8, moving at a considerable angle to the windrow with the majority of the stems in it lying generally parallel to the windrow, push the windrow more laterally than longitudinally, tending to hold the mass of stems together rather than telescoping them loosely into each other.

Referring again to FIGS. 1 - 3, another significant characteristic of the oblique reel in its pickup application is its oblique tine motion at the top of the reel 58. After moving at a high angle to the right of the direction of travel of the pickup 30 at its bottom as already described, and then rising at the front with a diminishing lateral component, the tines 49 move increasingly back toward the left until, at the top of the reel 58, they move at the same high angle (70° in this case) to the left of the direction of travel. Material being moved over the top of the guards 59 then, will be continuously carried toward the left as it is fed into the machine. This feature will allow important design economies in machines employing the oblique reel pickup, reducing or eliminating the need for other feeding elements normally required with the cylindrical pickup to gather material or feed it laterally into the machine as in the typical baler for example.

Figure 12:
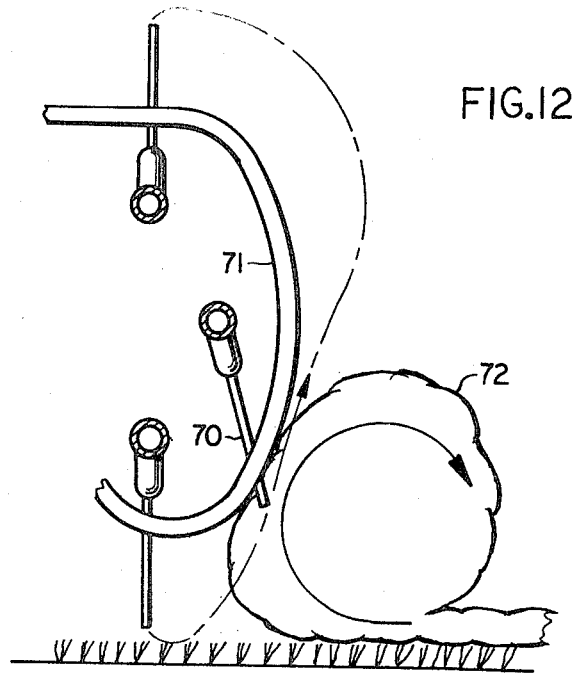

FIGS. 9 - 12 show a variation of the pickup application of the oblique reel wherein a cam 68 comparable to cam 57 of the pickup of FIGS. 1 -3 is rotatable about an axis perpendicular thereto, in this case the axis of drive shaft 69 comparable to drive shaft 39 of the pickup of FIGS. 1 - 3. The cam 68 is positioned as in FIG. 9 to provide pickup action as in FIG. 10, the tines 70 pointing generally radially outward between guards 71 to lift material 72. The cam 68 can be rotated to a second position as in FIG. 11 so that the tines rise from the ground remaining generally vertical as shown in FIG. 12, and with the oblique tine motion, the device acts as a side delivery rake, raking material 72 into a windrow. Thus, the oblique reel makes possible a convertible device which, by simply rotating a cam 68, can be changed from a pickup to a raking device or vice versa. Of course, such a device could take the form of conditioner of the type that lifts material over the reel to aerate it, and could form windrows by picking the material up as in FIG. 10 and delivering the material to the side on top of the guards, then depositing it at one side to the rear of the device. Also, an oblique reel pickup with a rotatable cam as described mounted on a machine such as a baler primarily for use as a pickup could be used as a rake to form or turn windrows.

In FIGS. 13 - 15 another version of the oblique reel is shown in the form of a new type of header reel to replace the cylindrical reel commonly employed in conjunction with the cutter bar in grain combines and direct cutting forage harvesting machines and the like. A header reel typically has an arm at each side supporting it in generally the same manner that arms 33 and 34 support the pickup reel 58 of FIGS. 1 - 3, and the reel 73 of FIGS. 13 - 15 would be supported in similar fashion. Shown is a left spider 74 (bottom of FIG. 13) mounted for rotation about a central axis and having four bearings 75 spaced equidistantly around its periphery with axes parallel to said central axis. Each bearing 75 has journaled in it the stub shaft portion of a U-joint 76, four such U-joints 76 being thus supported on the right side of left spider 74. The opposite end of each U-joint 76 is telescoped onto one end of a tine bar 77 and is pinned thereto by pin 78, four tine bars, thus supported at their left ends, extending parallel to each other at an angle to the axis of spider 74 (35° supplementary angle shown). At their right ends each tine bar 77 is journaled in an end support 79 having a stub shaft portion extending toward the right parallel to the stub shaft axes of U-joints 76. Adjacent to the right ends of tine bars 77 a right spider 80 is supported for rotation about a central axis parallel to those of the stub shaft portions of end supports 79 and to the axis of left spider 74. Right spider 80 also has four bearings 81 spaced equidistantly around its periphery with axes parallel to its central axis and to the stub shaft portions of end supports 79 which are journaled in the bearings 81 thus aligned. Thus, the tine bars 77 are supported as connecting links between the two spiders 74 and 80, and orbit bodily with the rotating spiders 74 and 80, and at the same time are rotatable on their own axes, being journaled at their right ends in end supports 79, and at their left ends being supported by U-joints 76 which are journaled in bearings 75 on left spider 74. At the left side of the oblique reel 73 thus formed (bottom of FIG. 13), to the stub shaft end of each U-joint 76 projecting on the left side of left spider 74, is affixed (splined) a follower lever 82, the other end of which carries a follower roller 83 axially aligned with the stub shaft portion of U-joint 76. A face type cam 84 is affixed to a left support arm (not shown), its groove encircling the central axis of left spider 74 adjacent to and parallel to it and restricting follower rollers 83 to follow between the two flanges forming the groove of cam 84. The outer flange of cam 84 is shown partially cut away to expose one of the four follower rollers 83. As the reel 73 revolves as indicated in FIGS. 13 and 14, the follower rollers 83, restricted within the groove of cam 84, cause follower levers 82, thus forced to trail generally behind their pivot axes on the stub shaft portions of U-joints 76, to rotate also. Thus, each U-joint 76 and its corresponding tine bar 77 is rotated individually by its corresponding follower lever 82, each tine bar 77 and the tines 85 affixed thereon making a complete revolution for each 360° of rotation of the reel 73.

In FIG. 15 a partial front elevation view taken from line 15 — 15 in FIG. 13 shows a tine bar 77 and affixed tines 85 descending as indicated by the arrow in the lower left of FIG. 14. In this lower front quadrant of the reel 73 the tines 85 move not only rearwardly and downwardly, as in FIG. 14, but also transversely as indicated by the arrows labeled V in FIG. 15. The tines 85 are formed so that they extend from the usual vertical orientation at a considerable transverse angle (25° shown) allowing them to penetrate downward into the stalks 86 with their oblique motion with a minimum tendency to push the stalks 86 down. This combination of transverse motion and transversely angled tines increases the tendency of the tines 85 to cross the stalks 86 at an angle as in FIG. 15 and thus, to engage the stalks 86 more positively. As they move rearwardly over the cutter bar generally indicated by numeral 87 in FIG. 14, the tines 85, due to their transverse motion and inclination, will tend to lift the stalks 86 as indicated by the arrow L in FIG. 15. This lifting tendency can be important in preventing crop material already partially fallen down from being even further pushed down and run over by the cutter bar 87, and the more positive engagement will reduce the chances of blockages over the cutter bar 87 and on the inclined feed table 88 which is found on many machines. Also, in FIG. 14 can be seen an important advantage of the oblique reel in its header reel application when compared to the parallel bar type reel (U.S. Pat. No. 3,338,036), the tines 85 having a variable inclination to tilt tips forward to efficiently engage the crop at the front of the reel 73, and then to incline oppositely at the rear to be generally perpendicular to the feed table 88 to easily lift material up its inclined surface.

FIGS. 16 and 17 show partial views only of the three tine bars 89 and attached tines 90 of another highly inclined oblique reel as in the pickup of FIGS. 1 - 3, but here in the form of a new type of bean snapper reel 91. FIG. 16 is a partial front elevation view of the machine as it advances along a row of bean stalks 92, the tines 90 combing upward through the stalks 92 to snap bean pods 93 from them. It is evident in this view that the oblique reel is much narrower than a cylindrical reel of comparable diameter or vertical tine displacement, and thus, can operate between rows of narrower spacing $S_r$. With typically two reels, one combing each side of each row, the advantage in reduced row spacing and corresponding increased plant population density could be very important. In FIG. 17 a partial side elevation view of the tine bars 89 and tines 90 shows their elliptical, almost circular, paths providing synchronization of the tines 90 with the stalks 92 (lower vector diagram). The velocity of the tines 90 with respect to the machine $V_{t/m}$ upward to the rear (to the right in FIG. 17) adds vectorially to the machine's forward velocity $V_m$ giving a resultant tine velocity $V_t$ generally vertical as compared to the high horizontal component with a cylindrical reel. Thus, the tines 90 start upward between the stalks 92 with much less tendency to bend them, break them off, or pull them out of the ground. Toward the top of the reel 91 tine motion becomes a more forward pointing vector $V_t'$, but at this higher level a given lateral displacement produces much less angular deflection of the stalks 92 and much less force between the tines 90 and the stalks 92 with correspondingly less tendency to break the stalks 92 or pull them out.

Returning to the header reel 73 of FIGS. 13 - 15, the relatively low inclination of the tine bars 77 to the axes of the spiders 74 and 80 (35°) chosen for this particular application allows using simple, low cost U-joints 76 instead of gearboxes as in the pickup of FIGS. 1 - 3. It will be recognized that a wide variety of couplings, universal joints, gears, and linkages and the like can be used for transferring motion from the cam and followers to the tine bars in any given version of the oblique reel of this invention depending primarily upon the aforementioned angle of inclination.

Referring to FIGS. 18 and 19, it will be evident that the present invention is not limited specifically to cam and follower means for accomplishing rotation of the tine bars. FIG. 18 is a partial sectional plan view (line 18 — 18 in FIG. 19) of a header reel (one side only shown) similar to that of FIGS. 13 - 15, generally indicated by numeral 93, having, instead of a cam and followers, a link 94, a lever 95, and knuckles 96 and 97 simply connecting each of four tine bars 98 to the spider 99. FIG. 19, a sectional elevation view of the reel 93 (line 19 — 19 in FIG. 18) shows an axial end view of the tine bars 98 journaled in end supports 100 (FIG. 18) which are journaled in turn in the spider 99 as the end supports 79 of FIG. 13 are journaled in bearings 81 of spider 80, both ends of each tine bar 98 being thus supported for rotation on its own axis. As the reel 93 revolves, the tine bars 98 with their attached tines 101 are caused to rotate generally with it, a lever 95 affixed to each tine bar 98 and connected to the rotating spider 99 by a link 94. Each link 94 is connected at one end to the spider 99 by a knuckle 96 having a stub shaft portion inserted for rotation in a hole in spider 99 and held in place by a pin 102, the link 94 being threaded loosely into the opposite end of the knuckle 96 to allow these two parts to pivot relatively about the axis of the link 94. Another knuckle 97 similarly connects the opposite end of each link 94 to one of four levers 95. It will be seen that, due to the inclination of spider 99 to the tine bars 98, as the reel revolves, the links 94 exhibit a continuously changing inclination with respect to levers 95, the knuckles 96 moving laterally with respect to the knuckles 97 at opposite ends of links 94 (FIG. 18). Thus, the tines 101, as viewed in FIG. 19, have a delayed rotational relationship to the reel 93 on the left, and an advanced rotational relationship to it on the right, rotation being clockwise as shown. Thus, this simpler mechanism provides a tine action very similar to the cam and follower type of FIGS. 13 - 15.

It will be understood, therefore, that numerous variations and applications are possible within the scope of this invention, and that the foregoing is intended to illustrate and describe the invention and not to limit its scope beyond that of the appended claims.

I claim:

1. A crop harvesting machine of the type which is adapted for traveling in a forward direction along rows of pod-bearing plants and picking said pods from said plants comprising:

a picker reel means having a reel axis within a vertical plane substantially parallel to said forward direction and comprising:

tines revolving about said reel axis for combing through said plants to pick said pods; and, a tine driving means for driving said tines with a motion having a velocity component relative to said crop harvesting machine parallel to said reel axis.

2. A crop harvesting machine as claimed in claim 1 wherein said tine driving means comprises bars on which said tines are mounted; and, end members which are rotatable about substantially parallel offset axes and to which respective ends of said tine bars are mounted for revolving about said offset axes.

3. A crop harvesting machine as claimed in claim 2 wherein said tine driving means further comprises tine bar mounting means for mounting said tine bars on said end members and for allowing said tine bars to rotate individually about axes substantially parallel to said tine bars.

* * * * *